Nov. 2, 1948.   C. D. KNOWLTON   2,452,663
MACHINE WITH RESILIENT WORK HOLDING CLAMP
Filed Sept. 27, 1947   2 Sheets-Sheet 1
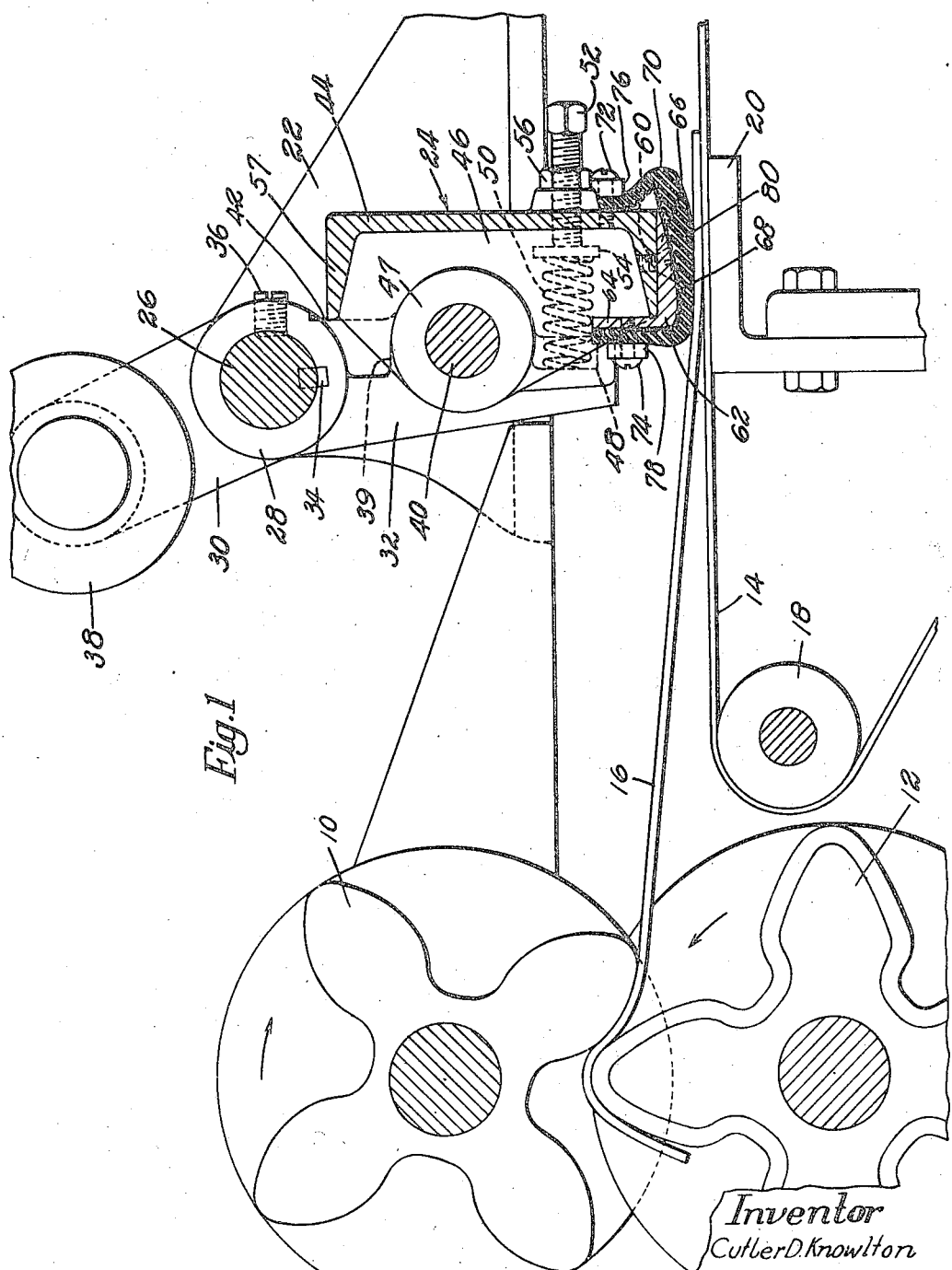

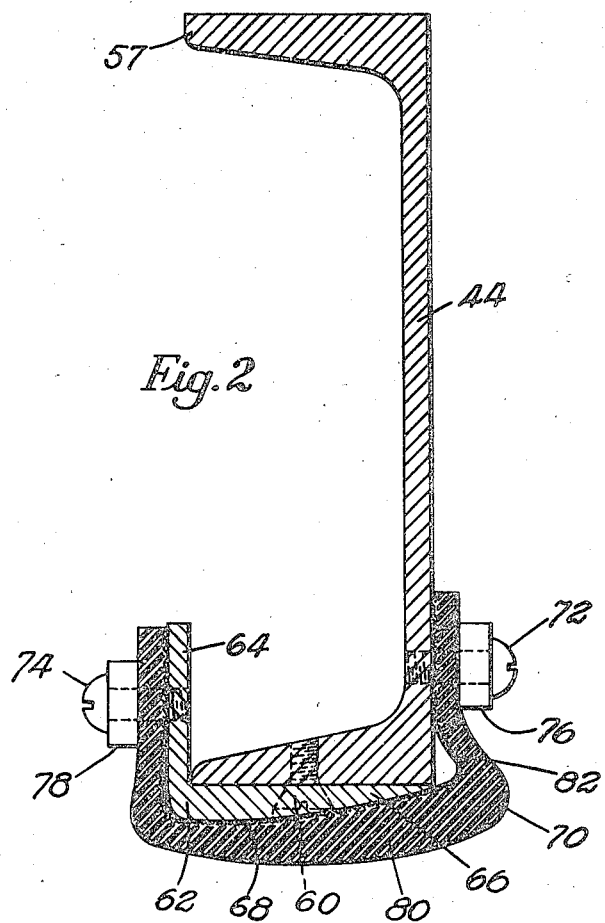
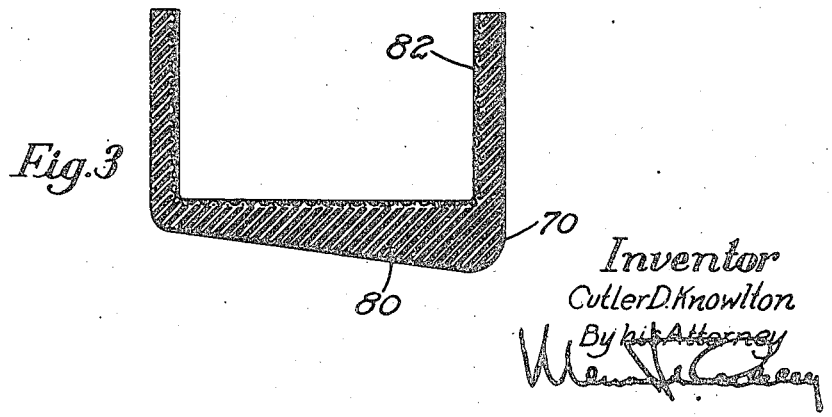

Patented Nov. 2, 1948

2,452,663

UNITED STATES PATENT OFFICE 2,452,663

MACHINE WITH RESILIENT WORK HOLDING CLAMP

Cutler D. Knowlton, Rockport, Mass., assignor to United Shoe Machinery Corporation, Flemington, N. J., a corporation of New Jersey Application September 27, 1947, Serial No. 776,547

9 Claims. (Cl. 69—34)

1

This invention relates to machines for treating sheet material such as hides, skins or leather, and more particularly to means for clamping or holding sheet material against undue displacement during treatment thereof. While the invention is herein illustrated as embodied in a staking machine of the type disclosed in Reissue Patent No. 22,649, granted June 5, 1945, upon an application filed in the names of Cutler D. Knowlton and David Edgar, it is to be understood that in various novel and useful aspects the invention is not limited to use in machines of the type herein disclosed or to clamping devices of the specific type illustrated.

By way of example, there is hereinafter described one convenient form of construction which is provided by the invention. The illustrative machine, except for the work clamping means, is fully disclosed in the Reissue Patent No. 22,649 above referred to. In that machine rotary and helically bladed staking rolls are mounted to treat work pieces introduced between them and fed to and from them with the aid of an endless conveyor belt to which the ends of consecutively treated work pieces are clamped and held against the pull of the staking rolls.

It is an object of the present invention to provide an improved clamping device for holding a spread-out work piece of sheet material against a work support on a work treating machine and to do so with whatever pressure that is required at all areas across the width of the work piece and without the work piece unduly slipping and becoming distorted at localized areas because of possible variance (although such variance be slight) in the work piece thickness or in the pull of the work treating tools. It is a further object of the invention to provide an improved clamping device that is self-regulating and which will firmly press the work piece against its support by means of a wedge action and that will not mar or distort the work piece in so doing.

A feature of the invention resides in a clamping device including two relatively slidable parts at least one of which is of such configuration in cross section as to give a wedge action against a work piece. Another feature of the invention is the work engaging part of the clamping device which part is made of a yieldable organic material to constitute a flexible wedge.

These and other important features of the invention and novel combinations of parts will now be described in detail in the specification and then pointed out more particularly in the appended claims.

2

In the drawings,

Fig. 1 is a sectional view of the operative parts comprising one form of work treating tools of a staking machine utilizing the work clamping device of the present invention;

Fig. 2 is an enlarged and sectional view of the clamping device shown in Fig. 1; and Fig. 3 is a sectional view of the work engaging part shown in Fig. 2 but prior to assembly as part of the clamping device.

The illustrated machine is shown only partially as the complete machine is shown in the patent above referred to (Reissue No. 22,649). Only those parts of the machine are illustrated which are necessary in order to explain the operation of the work clamping device which is the subject matter of the present invention. The invention is described as related to a leather staking machine in which the clamping device is moved and the tools are stationary but it is clear that many other types of machines are such that they may incorporate the present invention therein. The invention may be used with advantage in a machine in which not only is some other type of work performed but in which the clamping device is maintained in stationary position while the sheet material to be worked upon is being treated.

As referred to in the Reissue Patent No. 22,649, two meshing and spirally bladed work treating and tensioning rolls 10 and 12 (Fig. 1) are mounted for power rotation in the directions shown by the arrows. An endless conveyor 14 is mounted in position to support and present a work piece 16 to the bite of the rolls 10 and 12. The conveyor 14 is mounted on rollers, only one roller 18 of which is shown in the drawing. Beneath and in contact with the upper run of the conveyor belt 14 is a work support member 20 which extends transversely to the belt 14 and together with that belt constitutes a firm support at a localized area for the work piece 16. In the particular machine illustrated, the work support member 20 is arranged to move toward and away from the work treating rolls 10 and 12 and clamp supporting brackets are arranged to move therewith and slide upon the main machine frame (not shown). One clamp supporting bracket 22 is shown in Fig. 1 and it is to be understood that there are two such brackets one at each end of the clamping device generally indicated at 24 and at each side of the conveyor belt 14. The conveyor belt 14 is of such width that it is capable of supporting full sized hides or skins in their spread-out condition.

The clamping device 24 is hereinafter described as to its relation with the single clamp supporting bracket 22, as shown in Fig. 1, but it is to be understood that the clamping device 24 is similarly supported at or near its other end and that it is of sufficient length to pass across the conveyor belt 14 or the widest work piece to be treated.

A shaft 26 is journaled at its ends within the upper portions of the two clamp supporting brackets above referred to. A hub 28 (only one of which is shown in Fig. 1) bearing two arms 30 and 32 is keyed at 34 to the shaft 26 in a position close to each bracket 22. A set screw 36 is utilized to prevent movement of the hub 28 along the shaft 26. A cam roll 38 (not a part of the present invention) is mounted to rotate in a journal at one end of the arm 30, the function of this cam roll being identical with that of the cam roll in the patent referred to and as will be mentioned hereinafter. The arm 32 has a boss 39 at approximately a middle point of its length which boss serves as one of two supports for a shaft 40. In Fig. 1 it may be seen that the center line of shaft 40 is slightly to the left of an imaginary line drawn from the center line of shaft 26 to the center of the clamping pressure area on the work piece 16. Such an arrangement is, of course, necessary in a toggle mechanism as disclosed herein but it is to be understood that such a mechanism need not be combined with the clamping device of the present invention although such combination is preferred. The hub 28 and the arm 32 are machined to form a shoulder 42 which is adapted to perform a function subsequently to be described in connection with the toggle mechanism. A channel bar 44 extends approximately the full width of the conveyor belt 14 and carries spaced vertically extending flanges, one flange 46 being shown in Fig. 1. Each of these flanges carries a boss or hub, such as the hub 47, journaled on the shaft 40. The lower end of the arm 32 is formed with a cuplike recession 48 adapted to receive the end of a coil spring 50. A number of these springs 50 and corresponding parts may be used along the length of the channel bar 44 if so desired but in the present instance two springs are used, one for each hub on the shaft 26. The compression of the spring 50 may be varied by a set screw 52 which passes through and in threaded relation with the channel bar 44 and bears against a centering disk 54 abutting one end of the spring 50. An appropriate lock nut 56 is used on the set screw 52 to maintain the spring adjustment. The arrangement of the parts is such that when the clamping device 24 is in clamping position and in contact with a work piece 16 the edge of an upper flange 57 on the channel bar 44 contacts the shoulder 42, the latter constituting a stop means. The lower end of the channel bar 44 has affixed thereto by means of screws 60 (one of which is shown in Fig. 1), a member 62 which is L-shaped in cross section and which may be termed a pivotally mounted base part. One flange 64 of the pivotally mounted base part 62 extends toward the shaft 40 on the assembled clamping device 24 and the other flange 66 is preferably wedge shaped and bears a curved and polished surface 68 which is inclined downwardly and toward the tools 10 and 12.

A member 70 with a U-shaped cross section, which member may be called a work engaging part, is affixed to the channel bar 44 by a number of round headed screws 72 (only one of which is shown in Fig. 1) and to the flange 64 by round headed screws 74 (Fig. 1 shows only one). Washers 76 are utilized under the heads of the screws 72 and washers 78 are used beneath the screws 74.

The work engaging part 70 has a bottom portion 80 which is preferably wedge-shaped in cross section (thinnest at that part nearest to the tools 10 and 12) and the two flanges of the work engaging part 70 are of such width (as measured vertically on the illustrated machine) that relative motion between portion 80 and the base part 62 is permitted without placing undue stress on the material used to form the work engaging part 70 as it is flexed in operation. The latter part is formed of yieldable organic material such as neoprene, rubber, matted fiber, flexible plastic or laminated cloth. In the particular embodiment illustrated, the main body of the work engaging part 70 is formed of neoprene and the interior surfaces of that part are lined with fabric or canvas 82 adhesively secured or vulcanized thereto. The side of the canvas 82 not in contact with the organic material is kept clean and free of cement or other substances which may prevent a sliding action to be described. As may be seen in Figs. 1 and 2, the interior width of the work engaging part 70 is greater than the total width of the base part 62 in order to permit the requisite sliding action referred to.

The work engaging part 70 is made in the form illustrated in Fig. 3 and when assembled to complete the clamping device of the present invention it assumes the shape shown in Figs. 1 and 2. Upon assembling of these parts talc is placed between the clean surface of the fabric lining 82 and the polished surface 68 of the base part 62.

The base part 62 as well as the work engaging part 70 are each depicted as having a wedge configuration but it will be appreciated that other arrangements may be made in the operation of which a relative motion of the two parts will result in the desired wedge action against the work.

It will be appreciated, for example, that only one of the parts need be designed with an inclined surface to give the wedge action. The other part may well be of uniform thickness if so desired. Curved surfaces for parts 62 and 70 are preferred as they broaden the area of the work piece upon which the clamping pressure is applied. This lessens the possibility under some conditions of marring the work piece surface and also increases the smoothness with which the clamping action becomes effective.

In operating the illustrated machine the worker will introduce each work piece by throwing it upon the upper surface of the conveyor belt 14 after the work clamping device 24 has been swung upwardly and to the right, as viewed in Fig. 1, and about the shaft 26 as a center. The operator retains control of the work piece 16, holding one end thereof so that such work piece is spread out in fully extended condition on the moving belt 14 due to the friction between that belt and the work piece. When the worker is satisfied with the extended condition of the work piece 16 he causes the work clamping member 20 and the sliding brackets (one being the bracket 22) to move horizontally and on the main machine frame toward the work treating and tensioning means or rolls 10 and 12. As soon as this occurs, the cam roll 38 is permitted to rise and the work clamping device 24, including the base part 62 and the work engaging neoprene part 70, is rotated in a clockwise direction about the shaft 26 as viewed in Fig. 1. The part 70 will approach the work and its support at an acute angle as will be understood. The shoulder 42 prevents the clamping device 24 from rotating beyond a predetermined limit on the shaft 40. Disclosure of the mode of operation, exclusive of that for the specific clamp which forms the present invention, is all given in the aforesaid patent. The clockwise rotation of the work clamping device 24 causes the neoprene part 70 to be lowered upon and to engage the work piece 16 at an acute angle and to bring about an initial clamping of the latter to its support which comprises the belt 14 and the work clamping member 20. The fabric 82 will slide (to the right as viewed in Fig. 1) on and with relation to the polished surface 68 as the neoprene part 70 touches the work piece 16 and swings about shaft 26. The talc aids to bring about the sliding relation. As the tools 10 and 12 begin their treatment of the work piece 16, they place the work piece under tension. This tension brings about a further wedge action by the clamping device 24 as the neoprene part 70 now slides (with the work piece 16) to the left (as viewed in Fig. 1) a very short distance and with relation to the base part 62. If the work piece 16 varies in thickness and assuming that the tension imparted by the tools is uniform across the work piece, those portions of lesser thickness will slip through to a greater extent (but still only a very short distance) than will the thicker portions. The variance in slippage between the thicker and the thinner portions of the work piece will be exceedingly small but will nevertheless be sufficient to bring about a self-regulated and requisite pressure by virtue of the flexible and easily conformable or pliable nature of the organic material used in the making of part 70. This pressure by the clamping device will be exerted along the entire width of the work piece. It is obvious that such pressure will avoid distortion and marring of the work surface. As in the manner of the patented device the work piece 16 is first fed into the bite of the rolls 10 and 12 while the latter are revolving in the direction of the arrows shown in Fig. 1. The resulting work piece tension gives the further wedge action referred to above. The said rolls continue their rotation in the same direction while the work piece 16 is drawn back again or toward the right in Fig. 1 as it is held by the clamping device 24 and finally the work piece is returned to its initial position in which the work clamping device 24 is released by action of the cam roll 38 and breaking of the toggle. The operator then withdraws the work piece 16, reverses it end for end, and introduces it a second time into the machine to complete the treatment thereof.

A feature of the specific construction illustrated is that the channel bar 44 and its associated parts cooperate with the arms 32 and the shaft 26 to form a toggle mechanism, the operation of which is referred to above. After the work piece has been adequately treated the cam roll 38 is adapted to strike a cam surface (not shown) which functions to rotate the arms 30 and 32 counter-clockwise (Fig. 1) and to relieve the clamping pressure on the work piece 16. This operation (pressure release) is fully described in the patent referred to. The toggle is broken upon swinging movement of the arm 32 in an upward direction away from the work piece 16 and above the shaft 26 as a center, thereby instantaneously relieving pressure on the work piece and thus avoiding scuffing of the surface of the latter. The springs 50 will yield breaking the toggle when the arm 32 swings upwardly and this action shortens the distance between the work contacting face of the member 70 and the pivot or shaft 26, thus relieving the pressure.

It is to be noted that the wedge action exerted upon the work piece 16 is such as to give a holding pressure which is automatically increased at any given area when an increased tension at that area requires it. This results despite possible and common variations in the thickness of a work piece such as a hide or skin and despite rapid changes in the clamping requirements as take place during a staking operation, for example. Heretofore a lessening in the thickness of a work piece or a momentary increase in work piece tension at a localized area would cause the work piece to pull through at that area and to wrinkle and otherwise be distorted. With the present invention the yieldable organic material of member 70 will adhere to the work piece under the clamping pressure and it will distort in very small increments of work piece area as tension is placed on the work piece by the tools. The grip of the clamp is sure and even and the work piece is not subjected to distortion or surface marring and the tools which are used to treat the work piece encounter a more uniform resistance as they exert tension on the work piece throughout its width and this obviously increases the quality of the work which may be performed. It is to be noted also, that the clamping device of the present invention is such as to compensate for any possible deflection of the channel bar 44 or of the work support. Such deflection may occur with large work pieces such as hides or skins as both the clamping device and the work support must be of such size as to extend across the work to be treated.

If the tension in the work piece is uniform and if the work piece is uniform in thickness it then follows that the clamping pressure will be uniform across the width of the work piece. Such uniformity of pressure may be advantageous in some installations.

Having described my invention, what I claim as new and desire to secure by Letters Patent of the United States is:

1. In a machine for operating upon sheet material such as hides, skins, and leather, work treating and tensioning means, means for supporting a work piece for presentation of the latter to the work treating and tensioning means, and a work clamping device arranged to press said work piece against said supporting means, said device including a base part with a smooth surface and a work engaging part of wedge-like cross section, said work engaging part being arranged to slide on said smooth surface and wedge between the work piece and said surface.

2. In a machine for operating upon sheet material such as hides, skins, and leather, means for supporting a spread-out work piece, and a work clamping device arranged to press said work piece against said supporting means, said device including a base part with a smooth surface and a work engaging part arranged to slide on said smooth surface, said base part and work engaging part being so proportioned that a relative movement of said base part and work engaging part will press the work engaging part against said work piece by wedge action.

3. A machine having a clamping device for holding a spread-out work piece of sheet material against a support, said device including a base part mounted for motion at an acute angle toward and relative to said support and a work engaging part slidable on said base part and arranged by the action of said base part thereon to be wedged between said base part and a work piece on said support during said relative motion.

4. A machine having a support for a spread-out work piece of sheet material and a clamping device for holding said work piece against said support, said clamping device including two relatively slidable parts each being of such length as to extend across said work piece and at least one of which has a wedge-like cross section.

5. A machine having a support for a spread-out work piece of sheet material and a clamping device for holding said work piece against said support, said clamping device including two relatively slidable and contacting parts each extending across said support, one part being pivotally mounted and the other of said parts being of yieldable organic material and the latter part being arranged by the action of the said one part during its pivotal motion to be wedged between said work piece and said one part.

6. In a machine for treating sheet material such as hides, skins and leather, a work support, a clamping device for holding a work piece against said support, said clamping device including a movable base member with a surface inclined toward said support and also a work engaging member which is slidable relative to and in contact with said inclined surface and is of yieldable organic material, the arrangement of the inclined surface being such that a pull on the work piece operates to wedge the work engaging member between the work piece and the said inclined surface.

7. A machine having a support for a spread-out work piece of sheet material and a clamping device for holding said work piece against said support, said clamping device including two relatively slidable parts one of which has a wedge-like cross section and is of yieldable organic material.

8. A machine having a support for a spread-out work piece of sheet material such as a hide or skin and a clamping device for holding said work piece against said support, said clamping device including two relatively slidable parts at least one of which has a wedge-like cross section and being of yieldable organic material arranged to bear against said work piece.

9. A machine having a support for a spread-out work piece of sheet material and a clamping device for holding said work piece against said support, said clamping device including a base part pivotally mounted with relation to said support and a work engaging part mounted on said base part and slidable in relation therewith, the contacting surfaces being inclined toward said support, said work engaging part being of yieldable organic material and having a wedge-like cross section, said work engaging part being arranged to be wedged between said work piece and said base part when said base part is pivoted to move at an acute angle toward said support.

CUTLER D. KNOWLTON.

No references cited.